United States Patent
Mock et al.

(10) Patent No.: US 8,870,993 B2
(45) Date of Patent: Oct. 28, 2014

(54) SYSTEM AND METHOD FOR COUPLING AND SEALING FILTERS

(71) Applicants: Andrea J. Mock, Dripping Springs, TX (US); James L. Mock, Dripping Springs, TX (US)

(72) Inventors: Andrea J. Mock, Dripping Springs, TX (US); James L. Mock, Dripping Springs, TX (US)

(73) Assignee: Advanced Filtration Products, LLC, Austin, TX (US)

( * ) Notice: Subject to any disclaimer, the term of this patent is extended or adjusted under 35 U.S.C. 154(b) by 91 days.

(21) Appl. No.: 13/750,407

(22) Filed: Jan. 25, 2013

(65) Prior Publication Data

US 2013/0199140 A1 Aug. 8, 2013

Related U.S. Application Data

(63) Continuation-in-part of application No. 13/137,298, filed on Aug. 3, 2011, now abandoned.

(51) Int. Cl.
*B01D 46/00* (2006.01)

(52) U.S. Cl.
CPC ........ *B01D 46/0005* (2013.01); *B01D 46/0097* (2013.01); *Y10S 55/05* (2013.01); *Y10S 55/31* (2013.01)
USPC .............. 55/483; 55/484; 55/495; 55/DIG. 5; 55/DIG. 31

(58) Field of Classification Search
USPC ........... 55/483, 484, 502, 503, 511, 490, 495, 55/501, 506, 507, 517, 521, 385.1, 385.2, 55/DIG. 31; 454/187
See application file for complete search history.

(56) References Cited

U.S. PATENT DOCUMENTS

| | | | |
|---|---|---|---|
| 2,677,436 A | 8/1952 | Mazek | |
| 4,769,958 A | 9/1988 | Limp | |
| 5,279,090 A | 1/1994 | Yamaguchi et al. | |
| 6,099,612 A | 8/2000 | Bartos | |
| 6,916,352 B2 * | 7/2005 | Sutton et al. | 55/483 |

OTHER PUBLICATIONS

Co-Pending U.S. Appl. No. 13/137,298 entitled, "SNAPSTIK" to Mock et al. filed Aug. 3, 2011.
Non-Final Office Action for U.S. Appl. No. 13/137,298 mailed on Oct. 25, 2012.

* cited by examiner

*Primary Examiner* — Duane Smith
*Assistant Examiner* — Minh-Chau Pham
(74) *Attorney, Agent, or Firm* — Meyertons, Hood, Kivlin, Kowert & Goetzel, P.C.; Eric B. Meyertons

(57) ABSTRACT

In some embodiments, an air filter coupling device may include an elongated member, an elongated first cap, and an elongated second cap. The elongated member may include a substantially planar first side, a substantially planar second side positioned substantially opposite the first side, and a fourth side positioned substantially opposite the third side. In some embodiments, the elongated first cap may be coupled to the third side in a substantially orthogonal orientation relative to the elongated member. In some embodiments, the elongated second cap may be coupled to the fourth side in a substantially orthogonal orientation relative to the elongated member. A second distance between the first cap and the second cap adjacent each first end portion of the first and second caps inhibits removal of the first air filter. The air filter coupling device inhibits conveyance of materials between the first air filter and the second air filter.

20 Claims, 3 Drawing Sheets

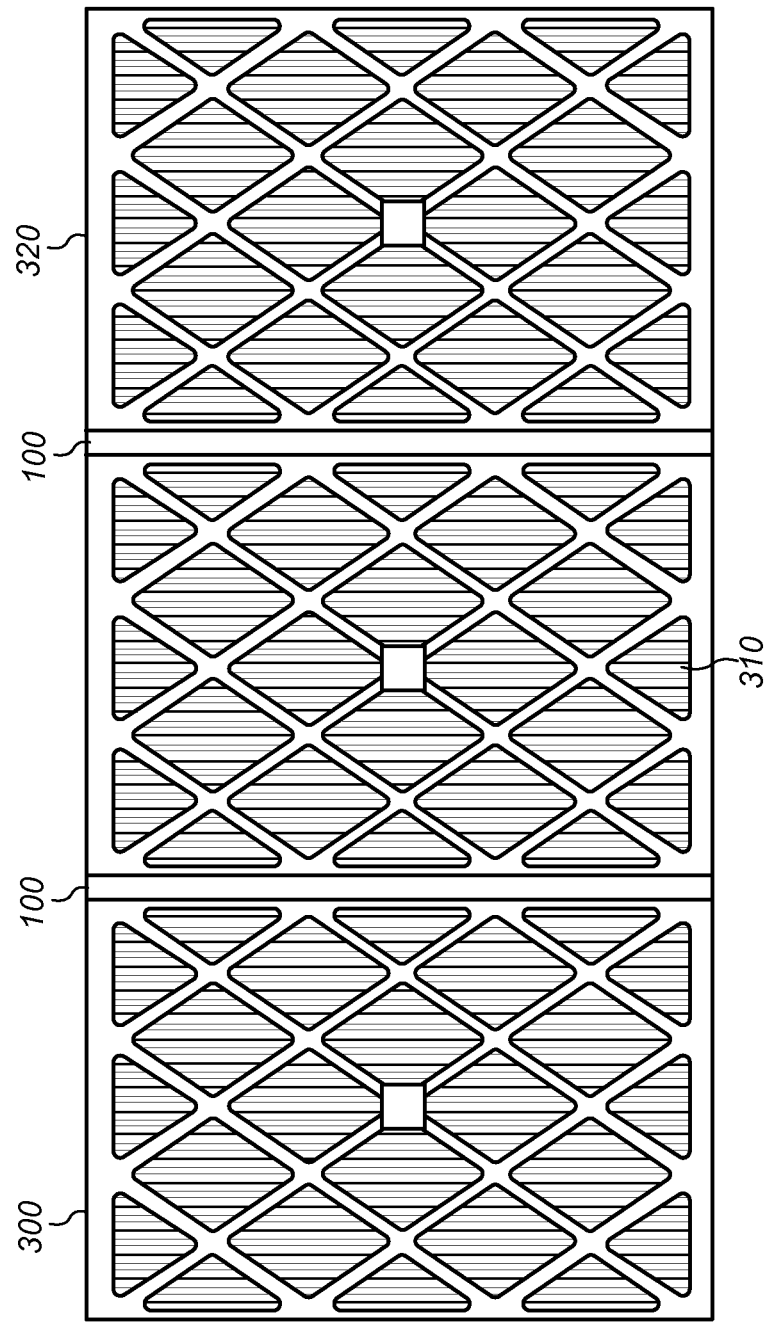

SYSTEM AND METHOD FOR COUPLING AND SEALING FILTERS

PRIORITY CLAIM

This application claims priority to, and is a continuation-in-part of, U.S. patent application Ser. No. 13/137,298 entitled "SNAPSTIK" filed on Aug. 3, 2011, which is incorporated by reference herein.

BACKGROUND OF THE INVENTION

1. Field of the Invention

The present disclosure generally relates to systems and methods for coupling filters to inhibit conveyance of materials between the coupled filters. More particularly, the disclosure generally relates to a device which couples together air filters used in, for example, HVAC systems.

2. Description of the Relevant Art

Heating, Ventilation, and/or Air Conditioning (HVAC) air filtration systems are used commonly throughout the modern world today. Quality of life would be drastically reduced without modern HVAC systems.

In general the three central functions of heating, ventilating, and air-conditioning are interrelated, especially with the need to provide thermal comfort and acceptable indoor air quality within reasonable installation, operation, and maintenance costs. HVAC systems can provide ventilation, reduce air infiltration, and maintain pressure relationships between spaces. The means of air delivery and removal from spaces is known as room air distribution.

HVAC system typically include some type of filtration system. Filtration systems associated with HVAC systems may provide multiple different functions. Filtration systems may function to remove airborne particulates. Removing airborne particulates may function to increase the efficiency and/or extend the functioning lifespan of the HVAC system. Removing airborne particulates may function to increase the air quality for inhabitants of a building.

Filtration systems typically use air filters. Commonly used air filters may include, for example, chemical filters with impregnated activated filter media; high efficiency bag filters; high efficiency particulate arrestance (HEPA) filters; spun fiberglass and paper media; and synthetic filter media. A high efficiency bag filter is sometimes used as a secondary stage in combination with a pre-filter stage for capturing respirable particles. High efficiency filter arrangements may be used in surgical facilities, medical wards, clean rooms, computer rooms, laboratories and other commercial applications where maintenance of clean and particle-free air is essential. There are many large HVAC systems in use, especially for large industrial buildings which require relatively large air filters. Typically multiple mass produced air filters are used together to produce an appropriately sized air filter for these large HVAC systems. Mass produced air filters are used to reduce maintenance costs, as opposed to having custom made air filters produced for the larger HVAC systems. Currently large HVAC systems use custom made filters, however, the cost to make custom size filters is usually 2 to 3 times more the cost of standard factory ordered filters. The use of custom filters can dramatically increase maintenance costs (e.g., for a large custom filter user such as a school district that can require thousands of custom size filters per year).

Problems with using multiple air filters in an array is that of the gaps or spaces between the air filters allowing air to bypass the filters by moving between the air filters through the spaces between the air filters. Problems with using multiple air filters in an array may include the extra difficulty and time required to install and/or replace multiple filters in the HVAC.

Therefore a coupling device and/or method which inhibits air leakage between air filters in an array, as well as facilitating filter exchange and installation would be highly desirable.

SUMMARY

This disclosure describes systems and methods related to, in some embodiments, an air filter coupling device. In some embodiments, an air filter coupling device may include an elongated member, an elongated first cap, and an elongated second cap. The elongated member may include a substantially planar first side, a substantially planar second side positioned substantially opposite the first side, and a fourth side positioned substantially opposite the third side. In some embodiments, the elongated first cap may be coupled to the third side in a substantially orthogonal orientation relative to the elongated member. In some embodiments, the elongated second cap may be coupled to the fourth side in a substantially orthogonal orientation relative to the elongated member. A second distance between the first cap and the second cap adjacent each first end portion of the first and second caps inhibits removal of the first air filter. The air filter coupling device inhibits conveyance of materials between the first air filter and the second air filter.

BRIEF DESCRIPTION OF THE DRAWINGS

Advantages of the present invention may become apparent to those skilled in the art with the benefit of the following detailed description of the preferred embodiments and upon reference to the accompanying drawings.

FIG. 5 depicts a diagram of a top view of an embodiment of two air filter coupling devices coupling a first air filter, a second air filter, and a third air filter.

Figure 1:
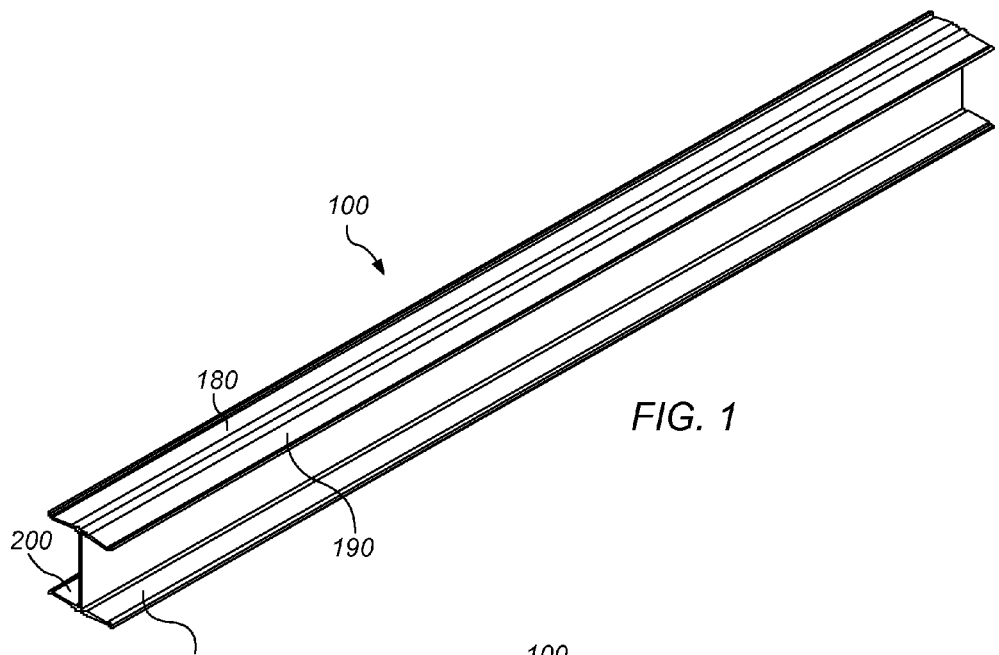
FIG. 1 depicts a diagram of a perspective view of an embodiment of an air filter coupling device.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

\* \* \*

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

Figure 2:
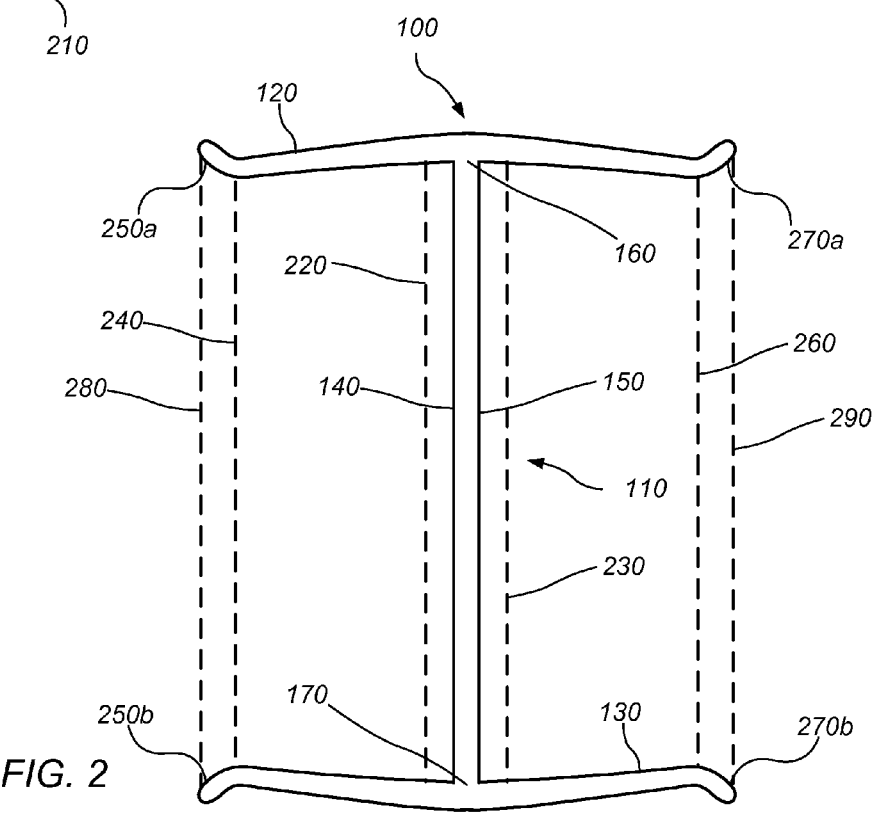
FIG. 2 depicts a diagram of an end view of an embodiment of an air filter coupling device.

This disclosure describes systems and methods related to, in some embodiments, an air filter coupling device. FIG. 1 depicts a diagram of a perspective view of an embodiment of air filter coupling device 100. FIG. 2 depicts a diagram of an end view of an embodiment of air filter coupling device 100. The air filter coupling device may include elongated member 110, elongated first cap 120, and elongated second cap 130. In some embodiments, the elongated member is substantially planar. The elongated member may include substantially planar first side 140, substantially planar second side 150 positioned substantially opposite the first side, third side 160 coupling the first and second sides, and fourth side 170 positioned substantially opposite the third side. The fourth side may couple the first and second sides. In some embodiments, the elongated member may include a substantially straight planar entity.

In some embodiments, elongated first cap 120 may be coupled to third side 160 in a substantially orthogonal orientation relative to elongated member 110. At least first portion 180 extending along a longitudinal axis of first cap 120 may extend beyond first side 140 and at least second portion 190 extending along a longitudinal axis of first cap 120 extends beyond second side 150. In some embodiments, elongated second cap 130 may be coupled to the fourth side in a substantially orthogonal orientation relative to the elongated member. At least first portion 200 extending along a longitudinal axis of the second cap may extend beyond the first side and at least second portion 210 extending along a longitudinal axis of the second cap may extend beyond the second side.

Figure 3:
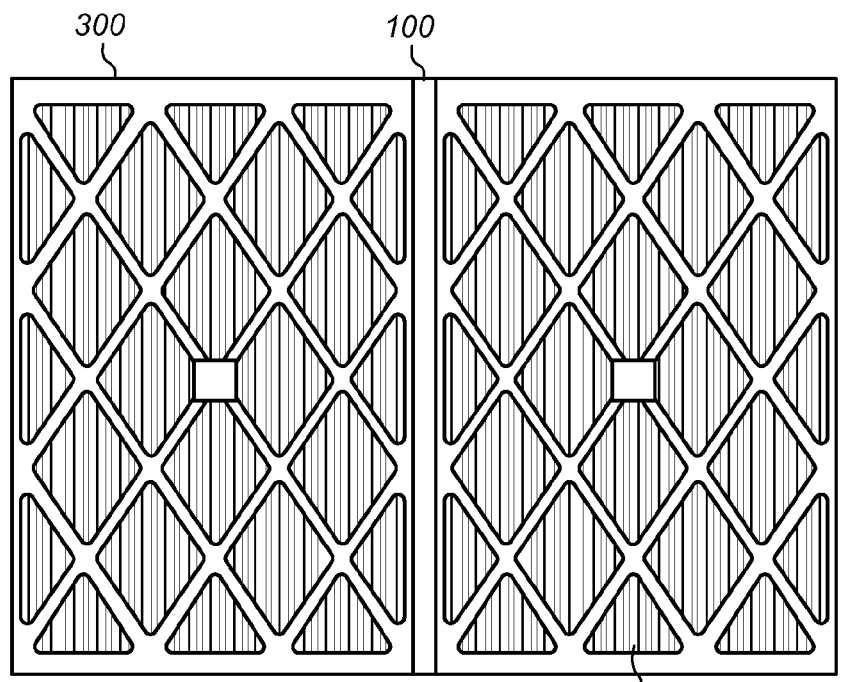
FIG. 3 depicts a diagram of a top view of an embodiment of an air filter coupling device coupling a first air filter and a second air filter.
Figure 4:
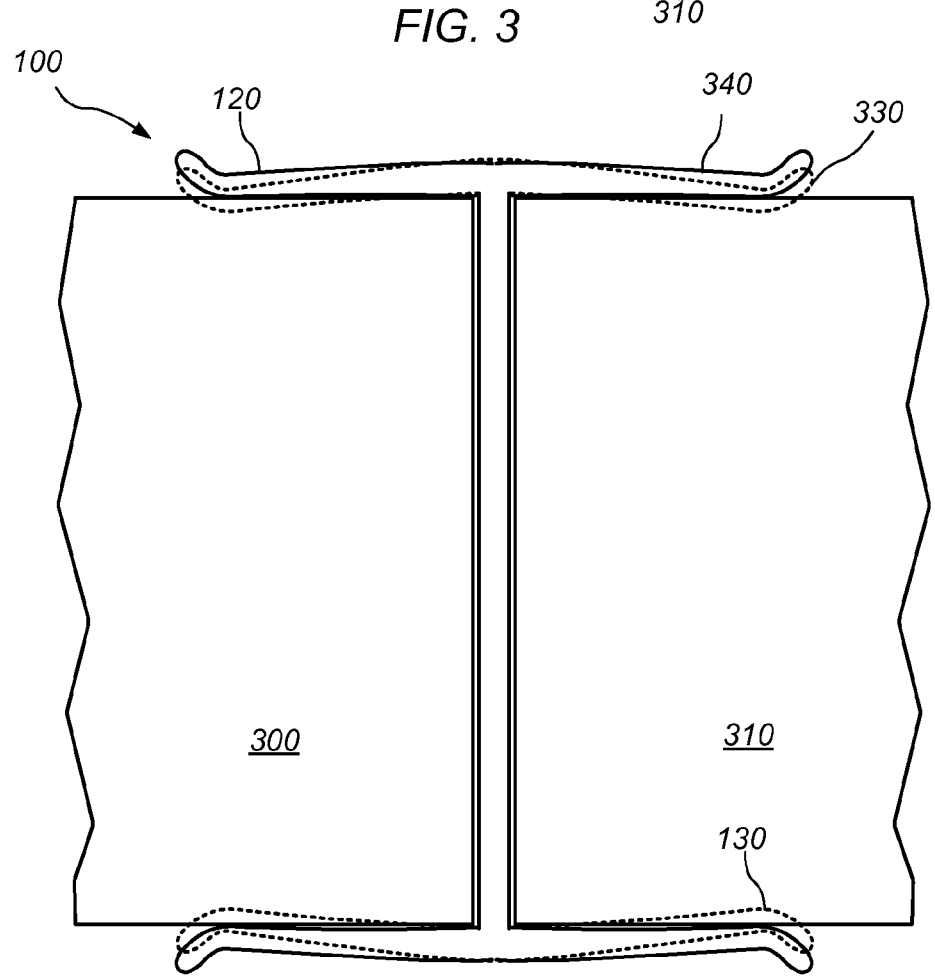
FIG. 4 depicts a diagram of an end view of an embodiment of an air filter coupling device coupling a first air filter and a second air filter.

FIGS. 3 and 4 depict a diagram of a top and an end view respectively of an embodiment of air filter coupling device 100 coupling first air filter 300 and second air filter 310. In some embodiments, first distance 220 between first portion 180 of the first cap and first portion 200 of the second cap adjacent the elongated member is substantially equivalent to or greater than a first width of a first air filter on first side 140 of the elongated member. In some embodiments, second distance 230 between second portion 190 of the first cap and second portion 210 of the second cap adjacent the elongated member is substantially equivalent to or in some embodiments slightly greater than a second width of the second air filter positioned on opposing second side 150 of the elongated member.

In some embodiments, third distance 240 between first cap 120 and second cap 130 adjacent each first end portion 250a,b of the first portions 180, 200 of the first and second caps is less than the width of first air filter 300 such that when the first air filter is positioned between the first portions of the first cap and the second cap on the first side of the elongated member the first end portions inhibit removal of the first air filter.

In some embodiments, fourth distance 260 between first cap 120 and second cap 130 adjacent each second end portion 270a,b, opposite the first end portions 250a,b, of second portions 190, 210 of the first and second caps is less than the width of second air filter 310 such that when the second air filter is positioned between the first cap and the second cap on the second side of the elongated member the second end portions inhibit removal of the second air filter.

In some embodiments, when the first air filter is positioned between the first cap and the second cap on the first side of the elongated member the first end portions form a friction fit with the first air filter. In some embodiments, when the second air filter is positioned between the first cap and the second cap on the second side of the elongated member the second end portions form a friction fit with the second air filter. These friction fits of the air filter coupling device allow the device to couple to air filters together.

In some embodiments, mechanisms may be used to further inhibit removal of an air filter coupled to device 100. For example, some types of adhesive may be used. The adhesive may be applied adjacent the end portions such that wherein the width is less than the width of the air filter an adhesive is placed on the surface. Typically an adhesive that is considered reusable would be used which is typically less powerful than most adhesives such as those developed by 3M. A material, not including adhesives, may be applied which further increases friction further inhibiting removal of air filters. In some embodiments, a natural or synthetic rubber material may be applied with an increase surface friction. Some of the mechanisms described for increasing the coefficient of friction may also facilitate inhibition of gases and/or particulate matter from passing between the filters where the device couples the filters together by increasing the seal between the caps and the air filters.

In some embodiments, mechanisms may be used to facilitate insertion of the air filters between the first and second caps of device 100. Mechanisms may facilitate insertion by decreasing the coefficient of friction between an interior surface of the cap and the air filter. Mechanisms may include a coating on at least a portion of the interior surface of the cap which decreases the coefficient of friction (e.g., a silicone based coating).

In some embodiments, a plurality of air filter coupling devices may be used in combination such that three or more air filters may be coupled together in any necessary arrangement. FIG. 5 depicts a diagram of a top view of an embodiment of two air filter coupling devices 100 coupling first air filter 300, second air filter 310, and third air filter 330. Coupling multiple air filters in this manner may facilitate an operator's manipulation of the air filters as compared to trying to handle, in this example, three filters individually (e.g., easier to insert and/or retrieve from an HVAC unit). In theory there is no limit to how many air filters might be coupled together using device 100. In some embodiments, the devices may eliminate the need for metal spacers that are provided by air conditioning unit manufacturers for positioning between air filters. Metal spacers typically do not fit properly, reduce air flow, and are most often left out of the unit because they simply fall out of the filter track and cannot be retrieved without much effort.

In some embodiments, first end portions 250$a,b$ of the first and second caps are turned away from each other at an angle such that fifth distance 280 between the first end portions of the first and second caps are greater than the first width of first air filter 300 such that insertion, during use, of the first air filter is facilitated. Second end portions 270$a,b$ of the first and second caps are turned away from each other at an angle such that sixth distance 290 between the second end portions of the first and second caps are greater than the second width of second air filter 310 such that insertion, during use, of the second air filter is facilitated. Insertion is facilitated because of the slope on end portions 250 and 270 and that the sixth distance is greater than the width of the air filter such that the air filter better engages the interior surfaces at the end portions of the first and second caps allowing an operator to better apply pressure on the caps using the air filter as the operator inserts the air filter between the caps coupling the air filter to device 100.

In some embodiments, at least the first and second end portions of the first cap and the second cap are substantially flexible such that the first and/or second air filter may be inserted between the first and/or second end portions. As the operator applies pressure on caps 120 and 130 using the air filter the caps flex from initial unengaged position 330 (e.g., as depicted by the dotted lines in FIG. 4) to engaged position 340 (e.g., as depicted by the solid lines in FIG. 4). The caps are biased towards the unengaged position (typically due to the inherent properties of the materials used and the manner in which the device is manufactured), such that after an operator pushes the air filter into device 100 flexing the caps outward the caps then naturally apply pressure on the air filters forming a friction fit coupling.

In some embodiments, the air filter coupling device inhibits conveyance of materials between the first air filter and the second air filter. Materials may include gasses (e.g., air) and/or solid materials. Solid materials may include, for example, any particulate matter conveyable by air being conveyed through, for example, a HVAC system. Inhibiting materials from passing in between air filters may ensure the air filters perform the function they were designed for such that particulate matter does not bypass the air filters.

In some embodiments, the air filter coupling device is formed as a single piece. In some embodiments, the air filter coupling device may be formed from multiple pieces. For example, the elongated member and the first and second caps may be formed separately and assembled after formation of the individual pieces. In some embodiments, the air filter coupling device may be formed in a variety of lengths for different sized air filters. In some embodiments, a user may mechanically reduce, for example, a length of the air filter coupling device as required to fit an air filter. In some embodiments, the air filter coupling device may include indicia (e.g., measurements in standardized units, measurements based upon known air filter sizes) used to assist a user in determining how much to reduce a dimension (e.g. length) of the air filter coupling device. The indicia (although the indicia are not required) may mark a frangible point(s) along the air filter coupling device wherein the device may be more easily broken to a desired length.

In some embodiments, the air filter coupling device includes a polymer, a metal, a wood, or any combination thereof. The device may be formed from a plastic or plastic composite material. The caps, at least, may be formed from an at least substantially flexible material. In some embodiments, the plastic composite may include a thermoset material. In some embodiments, the plastic composite may include a thermoplastic material. A thermoplastic material may include polyphenylene sulfide, polyetherimide, or polyamide-imide. A thermoplastic material is a material that undergoes no permanent change on heating, it flows when heated and may be reformed into a new shape. Exemplary ultra-high strength composite thermoplastic materials may include fiber-filled polyphthalamide (PPA), polyamide NM-6, aromatic polyamide, polyphenylene sulfide, polyetherimide, and polyamide-imide. The polyphthalamide component of fiber-filled polyphthalamide may include tereplithalamide, isoplithalamide and adipamide units. The fiber component of PPA may include from about 10% to 66% by weight of the PPA component. A composite may include a glass reinforced polyphthalamide having about 33 to about 45% glass.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. An air filter coupling device, comprising:
   an elongated member comprising:
      a substantially planar first side;
      a substantially planar second side positioned substantially opposite the first side;
      a third side coupling the first and second sides; and
      a fourth side positioned substantially opposite the third side, wherein the fourth side couples the first and second sides;
   an elongated first cap coupled to the third side in a substantially orthogonal orientation relative to the elongated member, wherein at least a first portion extending along a longitudinal axis of the first cap extends beyond the first side and at least a second portion extending along a longitudinal axis of the first cap extends beyond the second side;
   an elongated second cap coupled to the fourth side in a substantially orthogonal orientation relative to the elongated member, wherein at least a first portion extending along a longitudinal axis of the second cap extends beyond the first side and at least a second portion extending along a longitudinal axis of the second cap extends beyond the second side;
   wherein a first distance between the first cap and the second cap adjacent the first side of the elongated member is substantially equivalent to or greater than a first width of a first air filter on the first side of the elongated member;
   wherein a second distance between the first cap and the second cap adjacent the second side of the elongated member is substantially equivalent to or greater than a second width of a second air filter on the second side of the elongated member;
   wherein a third distance between the first cap and the second cap adjacent each first end portion of the first portions of the first and second caps is less than the width of the first air filter such that when the first air filter is positioned between the first portions of the first cap and the second cap on the first side of the elongated member the first end portions inhibit removal of the first air filter;
   wherein a fourth distance between the first cap and the second cap adjacent each second end portion, opposite the first end portion, of the second portions of the first and second caps is less than the width of the second air filter such that when the second air filter is positioned between the first cap and the second cap on the second side of the elongated member the second end portions inhibit removal of the second air filter; and
   wherein the first and second end portions of the first and second caps are turned away from each other at an angle such that a fourth and fifth distance between the first and second end portions of the first and second caps are greater than the first width of the first air filter and the second width of the second air filter respectively such that insertion, during use, of the first and second air filters is facilitated; and
   wherein the air filter coupling device inhibits conveyance of materials between the first air filter and the second air filter.

2. The device of claim 1, wherein the elongated member is substantially planar.

3. The device of claim 1, wherein the air filter coupling device is formed as a single piece.

4. The device of claim 1, wherein the air filter coupling device comprises a polymer.

5. The device of claim 1, wherein the air filter coupling device facilitates manipulation of the first and second air filters at the same time.

6. The device of claim 1, when the first air filter is positioned between the first cap and the second cap on the first side of the elongated member the first end portions form a friction fit with the first air filter.

7. The device of claim 1, when the second air filter is positioned between the first cap and the second cap on the second side of the elongated member the second end portions form a friction fit with the second air filter.

8. The device of claim 1, wherein at least the first and second end portions of the first cap and the second cap are substantially flexible, deforming under pressure, such that the first and/or second air filter may be inserted between the first and/or second end portions.

9. The device of claim 1, further comprising a coating applied to at least a portion of an interior surface adjacent the first and/or second end portions of the first and/or second caps.

10. The device of claim 1, further comprising a coating applied to at least a portion of an interior surface adjacent the first and/or second end portions of the first and/or second caps, wherein the coating increases a coefficient of friction between at least a portion of the interior surface and the first and/or the second air filter during use to inhibit decoupling of the first and/or the second air filter from the device.

11. The device of claim 1, further comprising a coating applied to at least a portion of an interior surface adjacent the first and/or second end portions of the first and/or second caps, wherein the coating decreases a coefficient of friction between at least a portion of the interior surface and the first and/or the second air filter during use to facilitate coupling of the first and/or the second air filter to the device.

12. The device of claim 1, further comprising at least one frangible portion which facilitates decreasing a length of the device during use.

13. A method, comprising:
   coupling a first air filter to a first side of an air filter coupling device;
   coupling a second air filter to a second side of the air filter coupling device, wherein the
      air filter coupling device comprises:
      an elongated member comprising:
      a substantially planar first side;
      a substantially planar second side positioned substantially opposite the first side;
      a third side coupling the first and second sides; and a fourth side positioned substantially opposite the third side, wherein the fourth side couples the first and second sides;

an elongated first cap coupled to the third side in a substantially orthogonal orientation relative to the elongated member, wherein at least a first portion extending along a longitudinal axis of the first cap extends beyond the first side and at least a second portion extending along a longitudinal axis of the first cap extends beyond the second side;

an elongated second cap coupled to the fourth side in a substantially orthogonal orientation relative to the elongated member, wherein at least a first portion extending along a longitudinal axis of the second cap extends beyond the first side and at least a second portion extending along a longitudinal axis of the second cap extends beyond the second side;

wherein a first distance between the first cap and the second cap adjacent the first side of the elongated member is substantially equivalent to or greater than a first width of a first air filter on the first side of the elongated member;

wherein a second distance between the first cap and the second cap adjacent the second side of the elongated member is substantially equivalent to or greater than a second width of a second air filter on the second side of the elongated member;

wherein a third distance between the first cap and the second cap adjacent each first end portion of the first portions of the first and second caps is less than the width of the first air filter such that when the first air filter is positioned between the first portions of the first cap and the second cap on the first side of the elongated member the first end portions inhibit removal of the first air filter;

wherein a fourth distance between the first cap and the second cap adjacent each second end portion of the s portions, opposite the first end portion, of the second portions of the first and second caps is less than the width of the second air filter such that when the second air filter is positioned between the first cap and the second cap on the second side of the elongated member the second end portions inhibit removal of the second air filter; and wherein the first and second end portions of the first and second caps are turned away from each other at an angle such that a fourth and fifth distance between the first and second end portions of the first and second caps are greater than the first width of the first air filter and the second width of the second air filter respectively such that insertion, during use, of the first and second air filters is facilitated; and inhibiting conveyance of materials between the first air filter and the second air filter using the air filter coupling device.

14. The method of claim 13, further comprising positioning the second air filter by manipulating the first air filter and/or the air filter coupling device.

15. The method of claim 13, wherein the elongated member is substantially planar.

16. The method of claim 13, wherein the air filter coupling device is formed as a single piece.

17. The method of claim 13, wherein the air filter coupling device comprises a polymer.

18. The method of claim 13, when the first air filter is positioned between the first cap and the second cap on the first side of the elongated member the first end portions form a friction fit with the first air filter.

19. The method of claim 13, when the second air filter is positioned between the first cap and the second cap on the second side of the elongated member the second end portions form a friction fit with the second air filter.

20. The method of claim 13, wherein at least the first and second end portions of the first cap and the second cap are substantially flexible, deforming under pressure, such that the first and/or second air filter may be inserted between the first and/or second end portions.

\* \* \* \* \*